US011184819B2

(12) United States Patent
Liu et al.

(10) Patent No.: US 11,184,819 B2
(45) Date of Patent: Nov. 23, 2021

(54) AVOIDING OUT OF ORDER UPLINK DATA RECEPTION UPON DATA RADIO BEARER RELEASE, HANDOVER TO ANOTHER DATA RADIO BEARER, OR QUALITY OF SERVICE FLOW ADDITION

(71) Applicant: QUALCOMM Incorporated, San Diego, CA (US)

(72) Inventors: Feilu Liu, San Diego, CA (US); Liping Shen, San Diego, CA (US); Suli Zhao, San Diego, CA (US); Vishal Sheth, San Diego, CA (US); Alok Mitra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/417,266

(22) Filed: May 20, 2019

(65) Prior Publication Data

US 2020/0100156 A1 Mar. 26, 2020

Related U.S. Application Data

(60) Provisional application No. 62/734,017, filed on Sep. 20, 2018.

(51) Int. Cl.
*H04W 36/08* (2009.01)
*H04W 28/02* (2009.01)
(Continued)

(52) U.S. Cl.
CPC ....... *H04W 36/08* (2013.01); *H04W 28/0268* (2013.01); *H04W 28/06* (2013.01); *H04W 36/30* (2013.01)

(58) Field of Classification Search
CPC combination set(s) only.
See application file for complete search history.

(56) References Cited

U.S. PATENT DOCUMENTS

2018/0255496 A1 9/2018 Kim
2018/0324631 A1\* 11/2018 Jheng ................ H04W 36/0022
(Continued)

FOREIGN PATENT DOCUMENTS

| CA | 3030542 A1 | 7/2018 |
|----|----|----|
| WO | WO-2018128452 A1 | 7/2018 |
| WO | WO-2018130968 A1 | 7/2018 |

OTHER PUBLICATIONS

International Search Report and Written Opinion—PCT/US2019/050377—ISA/EPO—dated Jan. 16, 2020.
(Continued)

*Primary Examiner* — Jinsong Hu
*Assistant Examiner* — Farideh Madani
(74) *Attorney, Agent, or Firm* — Patterson + Sheridan, LLP

(57) ABSTRACT

Certain aspects of the present disclosure provide techniques for avoiding out of order uplink data reception upon data radio bearer (DRB) release or quality of service (QoS) flow addition. An exemplary method that may be performed by a user equipment (UE), includes obtaining an indication that a first data radio bearer (DRB) is released or handed over to a second DRB, wherein a first mapping maps a first quality of service (QoS) flow to the first DRB; obtaining a second mapping that maps the first QoS flow to a second DRB; editing service data adaptation protocol (SDAP) headers of uplink protocol data units (PDUs) in an uplink transmission buffer associated with the first DRB, based on a difference between a first configuration of the first DRB and a second configuration of the second DRB; and transmitting the uplink PDUs via the second DRB.

16 Claims, 14 Drawing Sheets

(51) Int. Cl.
*H04W 28/06* (2009.01)
*H04W 36/30* (2009.01)

(56) References Cited

U.S. PATENT DOCUMENTS

2019/0028920 A1* 1/2019 Pan .................. H04L 47/24
2020/0053606 A1* 2/2020 Jung ................. H04W 24/10
2020/0396789 A1* 12/2020 Hori ................. H04W 76/20

OTHER PUBLICATIONS

Nokia, et al., QoS Flow Relocation, 3GPP Draft, 3GPP TSG-RAN WG2 #99, R2-1707993 QoS Flow Relocation, 3rd Generation Partnership Project (3GPP), Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017 (Aug. 20, 2017), XP051317907, 3 Pages, Retrieved from the Internet: URL:http://www.3gpp.org/ftp/Meetings_3GPP_SYNC/RAN2/Docs/, [retrieved on Aug. 20, 2017], the whole document.
Huawei et al., "QoS Flow to DRB Mapping", 3GPP Draft; R2-1701205, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Feb. 13, 2017-Feb. 17, 2017, Feb. 4, 2017 (Feb. 4, 2017), XP051223422, 6 Pages, Retrieved from the Internet: URL:http://www.3gpp.org/ftp/tsg_ran/WG2_RL2/TSGR2_97/Docs/ [retrieved on Feb. 4, 2017], sections 3.1, 3.2; pp. 1-5.
LG Electronics Inc: "Configurability for the Presence of SDAP Header", 3GPP Draft; R2-1801458 Configurability for the Presence of SDAP Header, 3rd Generation Partnership Project (3GPP), Mobile Competence Centre ; 650, Route Des Lucioles ; F-06921 Sophia-Antipolis Cedex ; France, vol. RAN WG2, No. Vancouver, Canada; Jna. 22, 2018-Jan. 26, 2018 Jan. 12, 2018, XP051386866, Retrieved from the Internet: URL:http://www.3gpp.org/ftp/tsg%5Fran/WG2%5FRL2/TSGR2%5FAHs/2018%5F01%5FNR/Docs/ [retrieved on Jan. 12, 2018], 3 pages.
Nokia et al., "Summary of Offline Discussions on iRAT Forwarding Solution", 3GPP Draft; R3-185159_IRATFWDINGSUMMARY, 3rd Generation Partnership Project (3GPP), Mobile Competence Centre ; 650, Route Des Lucioles ; F-06921 Sophia-Antipolis dex ; France, vol. RAN WG3, No. Gothenburg, Sweden; Aug. 20, 2018-Aug. 24, 2018 Aug. 28, 2018, XP051528488, Retrieved from the Internet: URL:http://www.3gpp.org/ftp/tsg%5Fran/WG3%5Fiu/TSGR3%5F101/Docs/R3%2D185159%2Ezip [retrieved on Aug. 28, 2018] para.2 option 1 & 1bis, 4 pages.
Partial International Search Report—PCT/US2019/050377—ISA/EPO—dated Oct. 31, 2019.

* cited by examiner

US 11,184,819 B2

AVOIDING OUT OF ORDER UPLINK DATA RECEPTION UPON DATA RADIO BEARER RELEASE, HANDOVER TO ANOTHER DATA RADIO BEARER, OR QUALITY OF SERVICE FLOW ADDITION

CROSS-REFERENCE TO RELATED APPLICATIONS

The present Application for Patent claims benefit of and priority to U.S. Provisional Patent Application No. 62/734,017, filed Sep. 20, 2018, which is assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for avoiding out of order uplink data reception upon data radio bearer (DRB) release, handover to another DRB, or quality of service (QoS) flow addition in wireless communications networks, such as $5^{th}$ Generation (5G) networks.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In aspects of the present disclosure, a method for wireless communications that may be performed by a user equipment (UE) is provided. The method generally includes obtaining an indication that a first data radio bearer (DRB) is released, wherein a first mapping maps a first quality of service (QoS) flow to the first DRB; obtaining a second mapping that maps the first QoS flow to a second DRB; editing service data adaptation protocol (SDAP) headers of uplink protocol data units (PDUs) in an uplink transmission buffer associated with the first DRB, based on a difference between a first configuration of the first DRB and a second configuration of the second DRB; and transmitting the uplink PDUs via the second DRB.

In aspects of the present disclosure, a method for wireless communications that may be performed by a user equipment (UE) is provided. The method generally includes receiving a non-access stratum (NAS) protocol data unit (PDU) session modification command for a PDU session that adds a new quality of service (QoS) flow having a first QoS flow identifier (QFI); determining that the UE does not have an uplink QoS flow to data radio bearer (DRB) mapping rule for the QoS flow having the first QFI; and, preventing, during a period subsequent to the determination, a service data adaptation protocol (SDAP) layer of the UE from processing and transmitting uplink data associated with the QoS flow having the first QFI.

In aspects of the present disclosure, a method for wireless communications is provided. The method generally includes receiving a configuration of a protocol data unit (PDU) session, wherein the configuration does not identify a default data radio bearer (DRB) of the PDU session and a quality of service (QoS) flow of the PDU session does not have a QoS flow to DRB mapping rule configured; subsequent to a period elapsing after receiving the configuration, determining if the configuration still holds; when the configuration still holds: when a DRB of the PDU session that contains a QoS flow associated with the default QoS rule is configured to use uplink service data adaptation protocol (SDAP) headers, mapping the QoS flow to the DRB; and when the DRB of the PDU session that contains the QoS flow associated with the default QoS rule is not configured to use uplink SDAP headers, mapping the QoS flow to another DRB that does not contain a guaranteed bit rate (GBR) QoS flow and is configured to use uplink SDAP headers.

In aspects of the present disclosure, an apparatus for wireless communications is provided. The apparatus generally includes a processor configured to obtain an indication that a first data radio bearer (DRB) is released, wherein a first mapping maps a first quality of service (QoS) flow to the first DRB; obtaining a second mapping that maps the first QoS flow to a second DRB; to edit service data adaptation protocol (SDAP) headers of uplink protocol data units (PDUs) in an uplink transmission buffer associated with the first DRB, based on a difference between a first configuration of the first DRB and a second configuration of the second DRB; and to transmit the uplink PDUs via the second DRB; and a memory coupled with the processor.

In aspects of the present disclosure, an apparatus for wireless communications is provided. The apparatus generally includes a processor configured to receive a non-access stratum (NAS) protocol data unit (PDU) session modification command for a PDU session that adds a new quality of service (QoS) flow having a first QoS flow identifier (QFI); to determine that the apparatus does not have an uplink QoS flow to data radio bearer (DRB) mapping rule for the QoS flow having the first QFI; and, to prevent, during a period subsequent to the determination, a service data adaptation protocol (SDAP) layer of the apparatus from processing and transmitting uplink data associated with the QoS flow having the first QFI; and a memory coupled with the processor.

In aspects of the present disclosure, an apparatus for wireless communications is provided. The apparatus generally includes a processor configured to receive a configuration of a protocol data unit (PDU) session, wherein the configuration does not identify a default data radio bearer (DRB) of the PDU session and a quality of service (QoS) flow of the PDU session does not have a QoS flow to DRB mapping rule configured; to determine, subsequent to a period elapsing after receiving the configuration, if the configuration still holds; when the configuration still holds: to map the QoS flow to the DRB, when a DRB of the PDU session that contains a QoS flow associated with the default QoS rule is configured to use uplink service data adaptation protocol (SDAP) headers; and to map the QoS flow to another DRB that does not contain a guaranteed bit rate (GBR) QoS flow and is configured to use uplink SDAP headers, when the DRB of the PDU session that contains the QoS flow associated with the default QoS rule is not configured to use uplink SDAP headers; and a memory coupled with the processor.

In aspects of the present disclosure, an apparatus for wireless communications is provided. The apparatus generally includes means for obtaining an indication that a first data radio bearer (DRB) is released, wherein a first mapping maps a first quality of service (QoS) flow to the first DRB; means for obtaining a second mapping that maps the first QoS flow to a second DRB; editing service data adaptation protocol (SDAP) headers of uplink protocol data units (PDUs) in an uplink transmission buffer associated with the first DRB, based on a difference between a first configuration of the first DRB and a second configuration of the second DRB; and means for transmitting the uplink PDUs via the second DRB.

In aspects of the present disclosure, an apparatus for wireless communications is provided. The apparatus generally includes means for receiving a non-access stratum (NAS) protocol data unit (PDU) session modification command for a PDU session that adds a new quality of service (QoS) flow having a first QoS flow identifier (QFI); means for determining that the apparatus does not have an uplink QoS flow to data radio bearer (DRB) mapping rule for the QoS flow having the first QFI; and, means for preventing, during a period subsequent to the determination, a service data adaptation protocol (SDAP) layer of the apparatus from processing and transmitting uplink data associated with the QoS flow having the first QFI.

In aspects of the present disclosure, an apparatus for wireless communications is provided. The apparatus generally includes means for receiving a configuration of a protocol data unit (PDU) session, wherein the configuration does not identify a default data radio bearer (DRB) of the PDU session and a quality of service (QoS) flow of the PDU session does not have a QoS flow to DRB mapping rule configured; means for determining if the configuration still holds subsequent to a period elapsing after receiving the configuration; means for mapping the QoS flow to the DRB when the configuration still holds and when a DRB of the PDU session that contains a QoS flow associated with the default QoS rule is configured to use uplink service data adaptation protocol (SDAP) headers; and means for mapping the QoS flow to another DRB that does not contain a guaranteed bit rate (GBR) QoS flow and is configured to use uplink SDAP headers, when the configuration still holds and when the DRB of the PDU session that contains the QoS flow associated with the default QoS rule is not configured to use uplink SDAP headers.

In aspects of the present disclosure, a computer-readable medium for wireless communications is provided. The computer-readable medium includes instructions that, when executed by a processor, cause the processor to perform operations generally including obtaining an indication that a first data radio bearer (DRB) is released, wherein a first mapping maps a first quality of service (QoS) flow to the first DRB; obtaining a second mapping that maps the first QoS flow to a second DRB; editing service data adaptation protocol (SDAP) headers of uplink protocol data units (PDUs) in an uplink transmission buffer associated with the first DRB, based on a difference between a first configuration of the first DRB and a second configuration of the second DRB; and transmitting the uplink PDUs via the second DRB.

In aspects of the present disclosure, a computer-readable medium for wireless communications is provided. The computer-readable medium includes instructions that, when executed by a processor, cause the processor to perform operations generally including receiving a non-access stratum (NAS) protocol data unit (PDU) session modification command for a PDU session that adds a new quality of service (QoS) flow having a first QoS flow identifier (QFI); determining that an apparatus including the processor does not have an uplink QoS flow to data radio bearer (DRB) mapping rule for the QoS flow having the first QFI; and, preventing, during a period subsequent to the determination, a service data adaptation protocol (SDAP) layer of the apparatus from processing and transmitting uplink data associated with the QoS flow having the first QFI.

In aspects of the present disclosure, a computer-readable medium for wireless communications is provided. The computer-readable medium includes instructions that, when executed by a processor, cause the processor to perform operations generally including receiving a configuration of a protocol data unit (PDU) session, wherein the configuration does not identify a default data radio bearer (DRB) of the PDU session and a quality of service (QoS) flow of the PDU session does not have a QoS flow to DRB mapping rule configured; subsequent to a period elapsing after receiving the configuration, determining if the configuration still holds; when the configuration still holds: when a DRB of the PDU session that contains a QoS flow associated with the default QoS rule is configured to use uplink service data adaptation protocol (SDAP) headers, mapping the QoS flow to the DRB; and when the DRB of the PDU session that contains the QoS flow associated with the default QoS rule is not configured to use uplink SDAP headers, mapping the QoS flow to another DRB that does not contain a guaranteed bit rate (GBR) QoS flow and is configured to use uplink SDAP headers.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
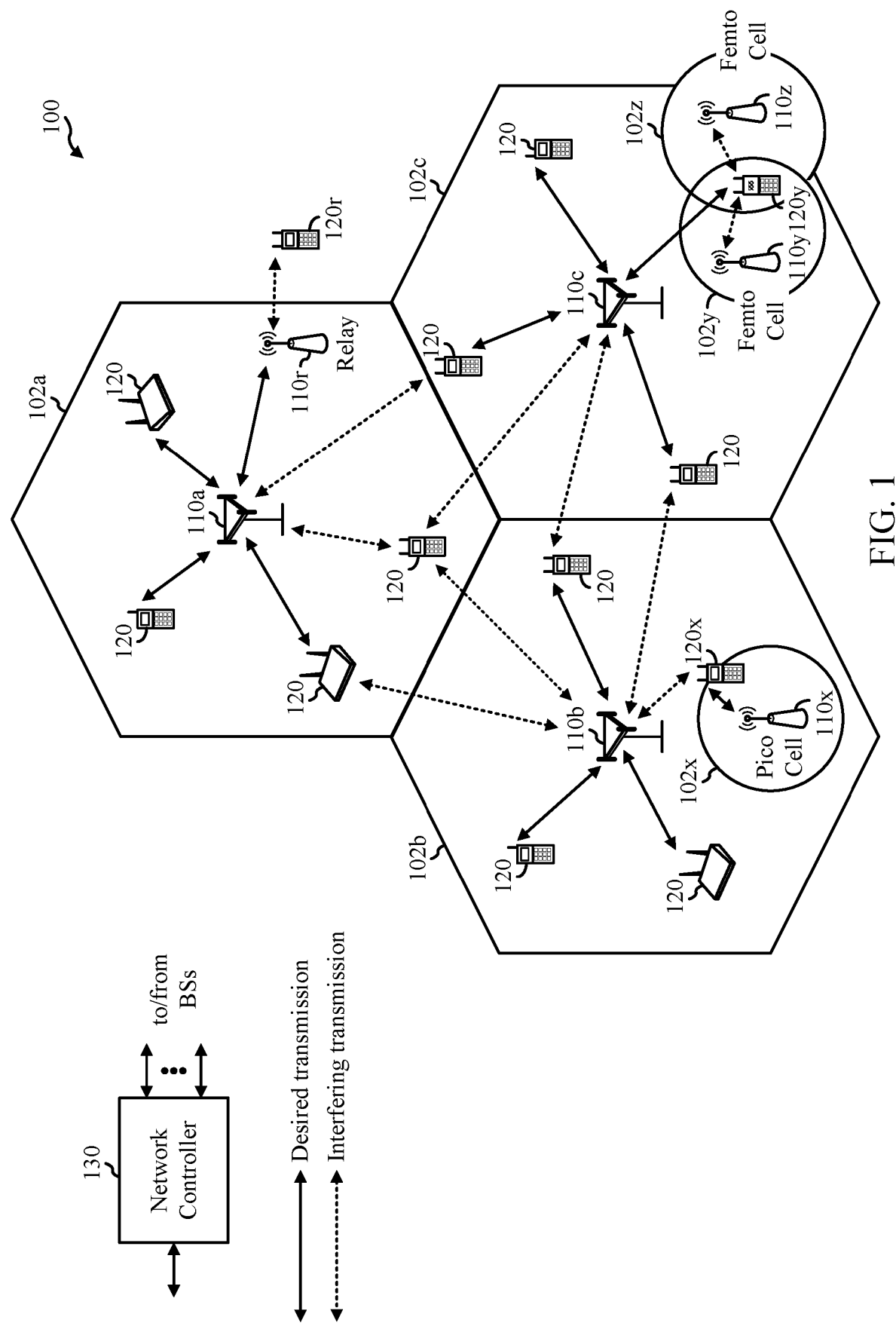
FIG. 1 is a block diagram conceptually illustrating an example telecommunications system, in accordance with certain aspects of the present disclosure.

Aspects of the present disclosure provide apparatus, methods, processing systems, and computer readable mediums for avoiding out of order uplink data reception upon data radio bearer (DRB) release, handover to another DRB, or quality of service (QoS) flow addition in wireless communications networks, such as 5$^{th}$ Generation (5G) networks.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks.

The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with $3^{rd}$ Generation (3G) and/or $4^{th}$ Generation (4G) wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or wider) communications, millimeter wave (mmW) targeting high carrier frequency (e.g., 25 GHz or higher) communications, massive machine type communications (mMTC) targeting non-backward compatible machine type communications (MTC) techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. The systems and methods for avoiding out of order uplink data transmission upon data radio bearer (DRB) release or quality of service (QoS) flow addition in wireless communications networks described with respect to FIGS. 11, 12, and 13, below, may be implemented within wireless communication network 100.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to eight transmit antennas with multi-layer DL transmissions up to eight streams and up to two streams per UE. Multi-layer transmissions with up to two streams per UE may be supported. Aggregation of multiple cells may be supported with up to eight serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
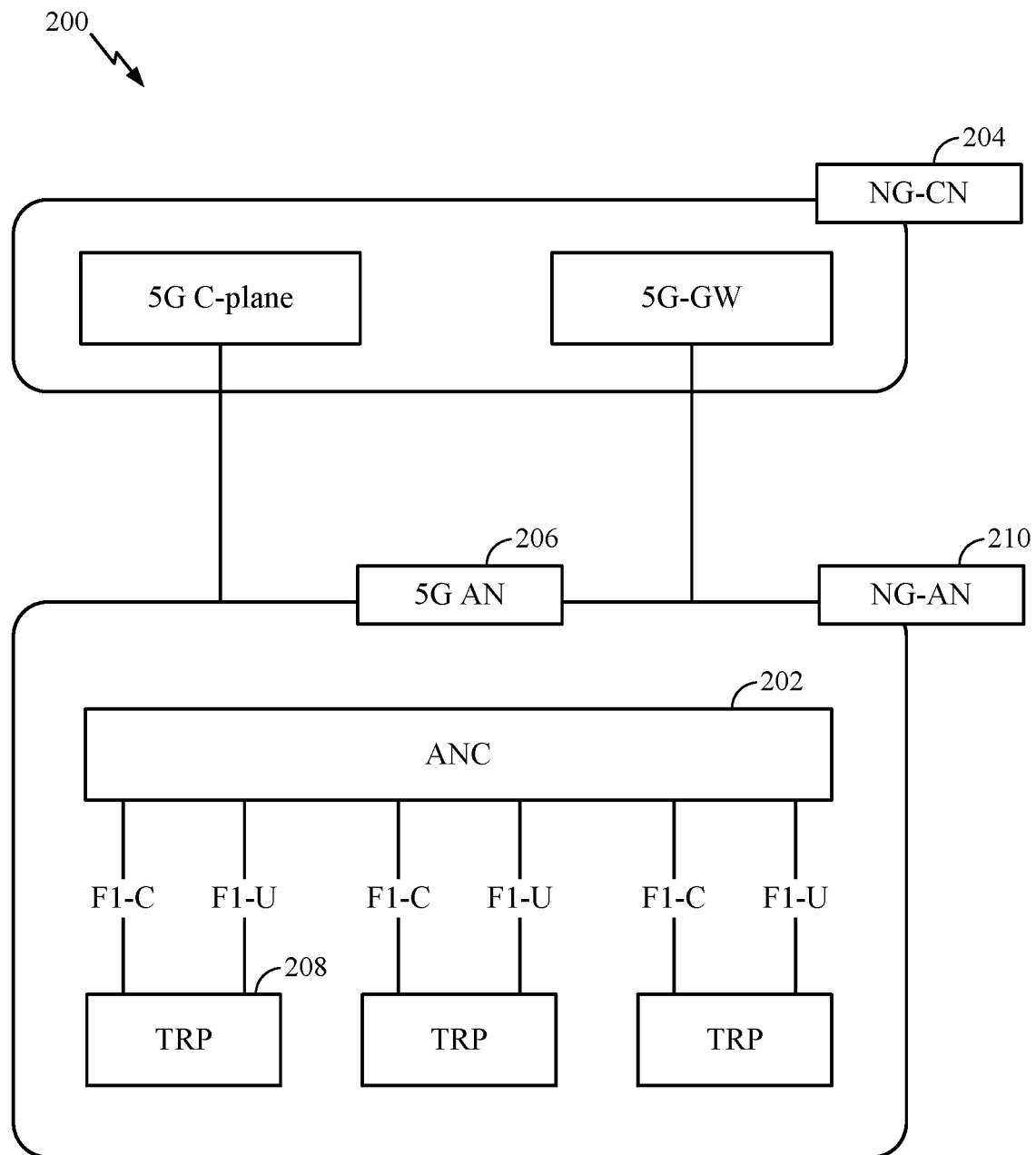
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
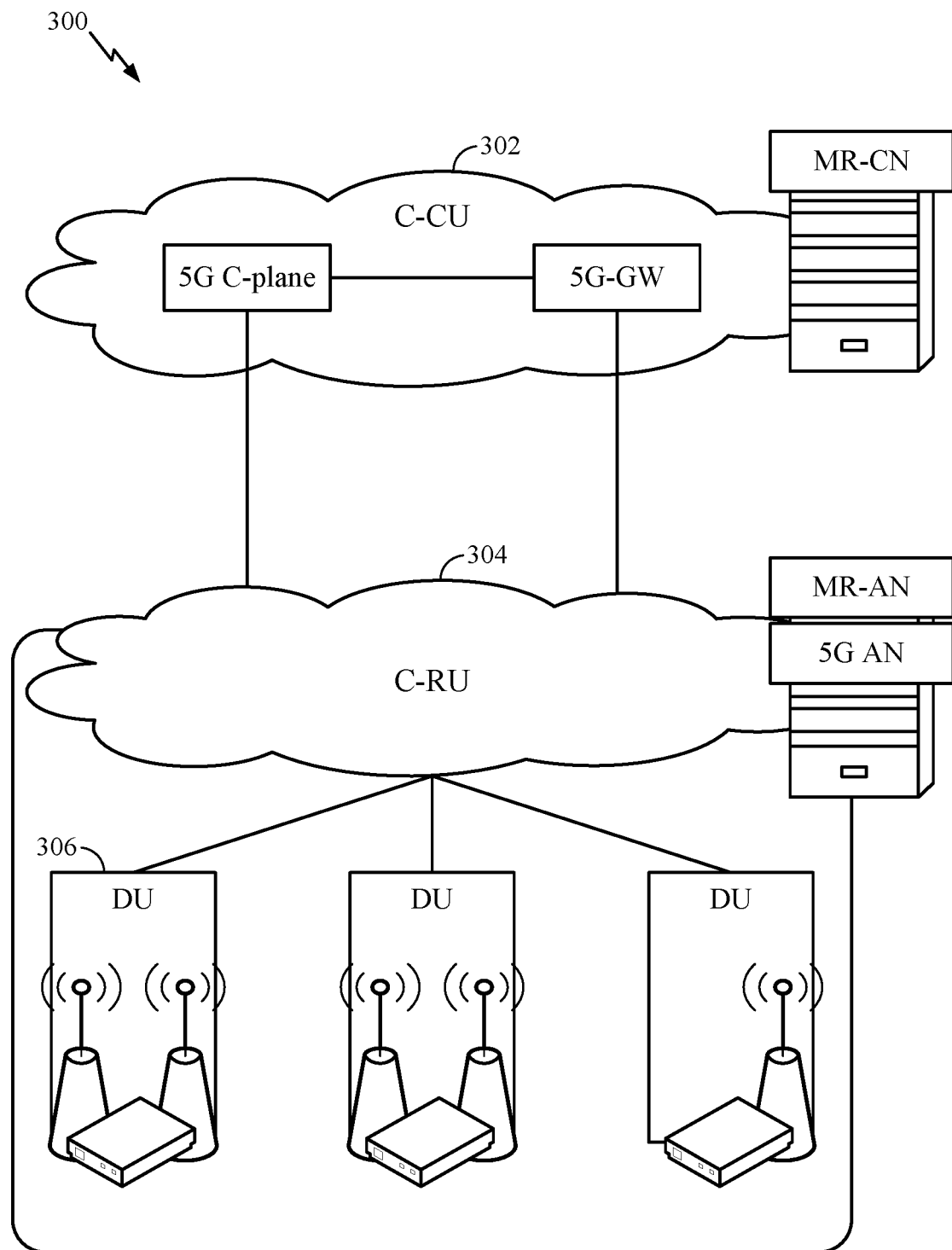
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
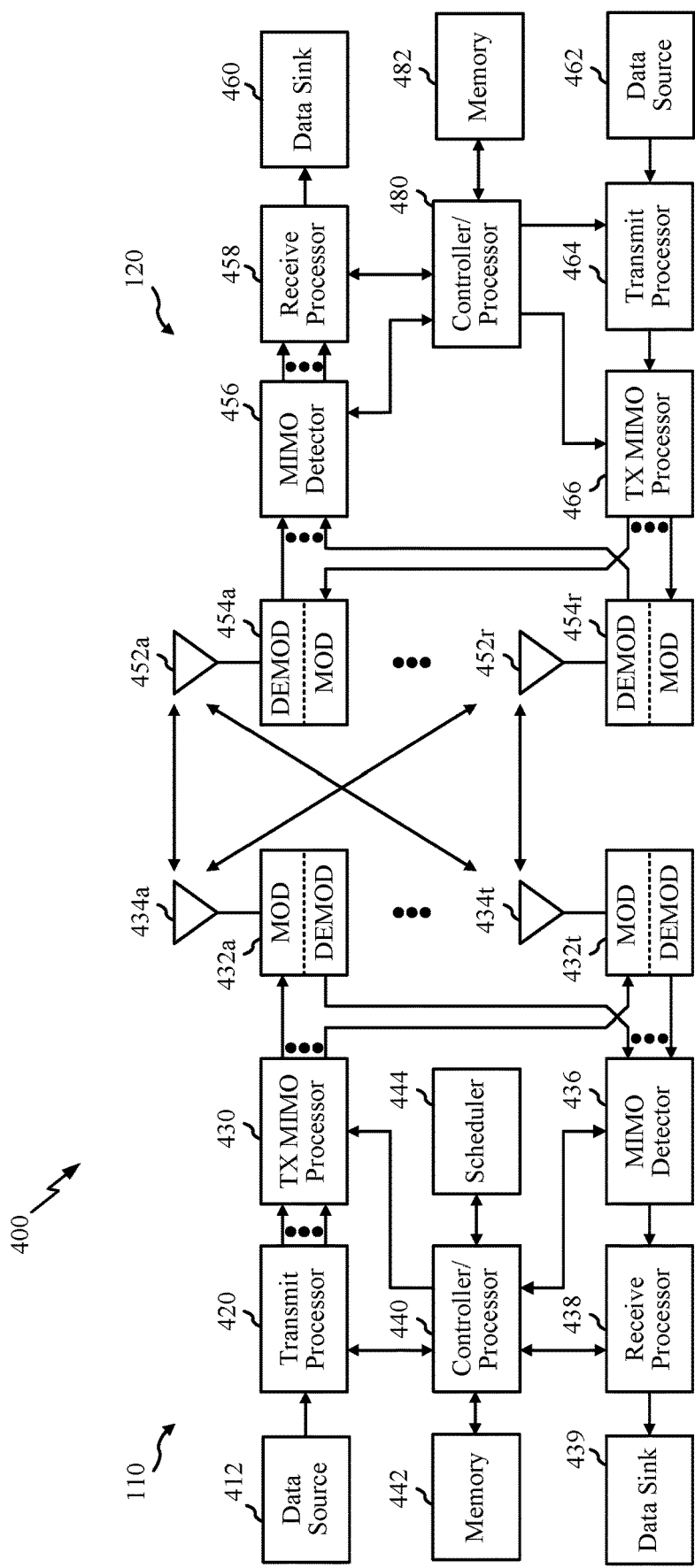
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein, such as those described with respect to FIGS. 11, 12, and 13.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
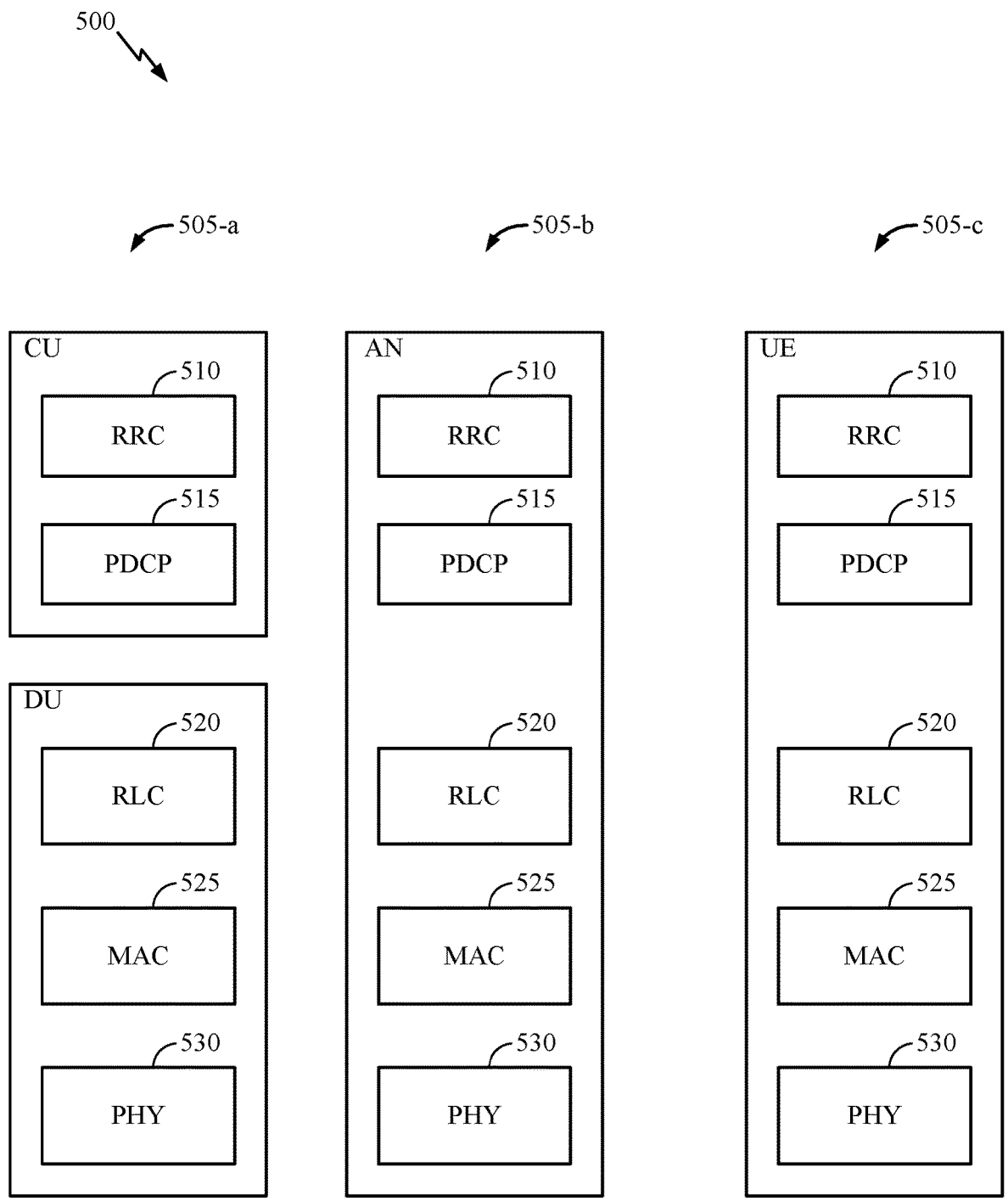
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
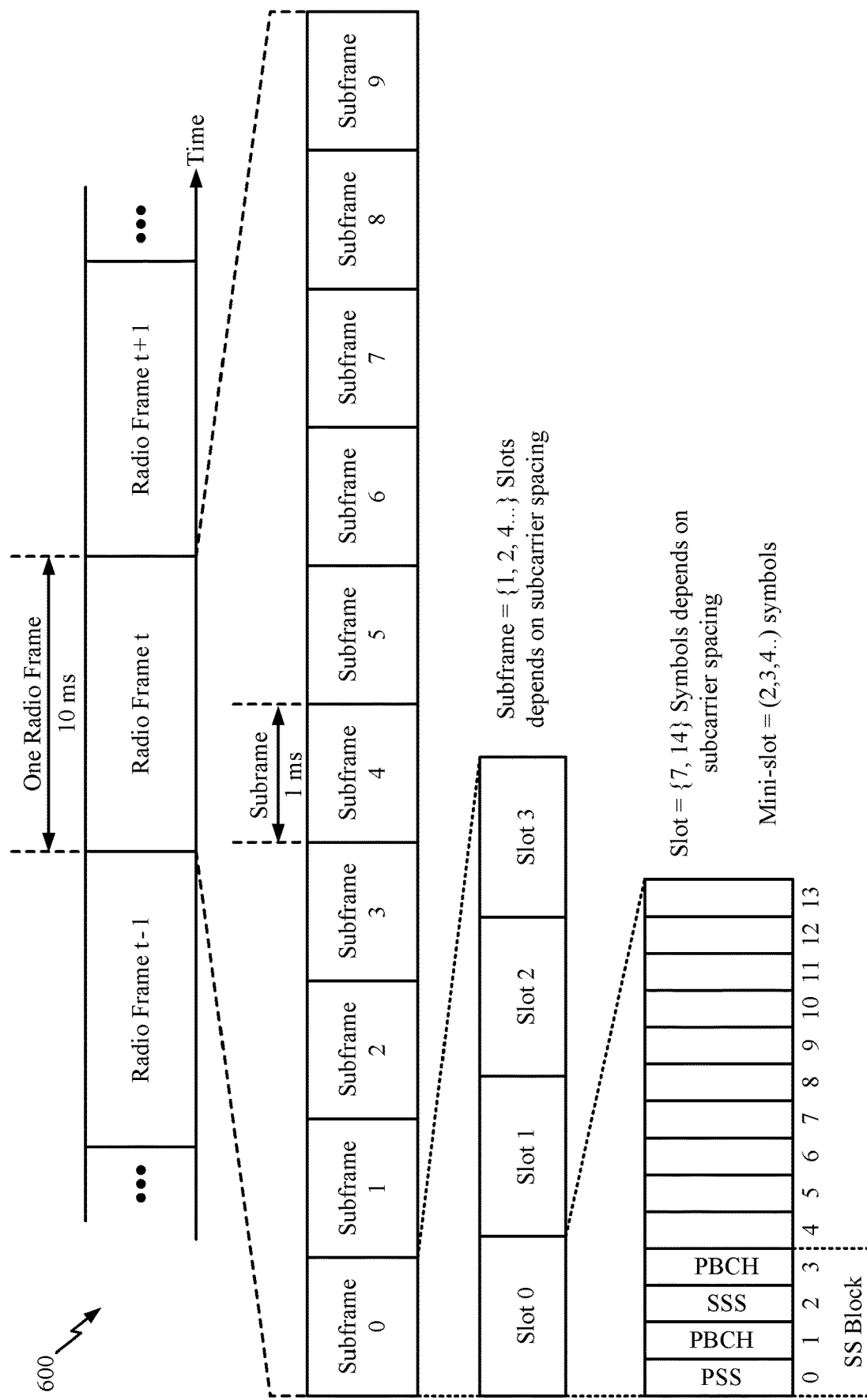
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Quality of Service Model in 5G Networks

The 5G quality of service (QoS) model is based on QoS flows and supports both QoS flows that require guaranteed flow bit rate (GBR QoS Flows) and QoS flows that do not require guaranteed flow bit rate (non-GBR QoS Flows). At non-access stratum (NAS) level, the QoS flow is thus the finest granularity of QoS differentiation in a protocol data unit (PDU) session. In some embodiments, a QoS flow is identified within a PDU session by a QoS flow identifier (QFI) carried in an encapsulation header over next generation user plane (NG-U).

Figure 7A:
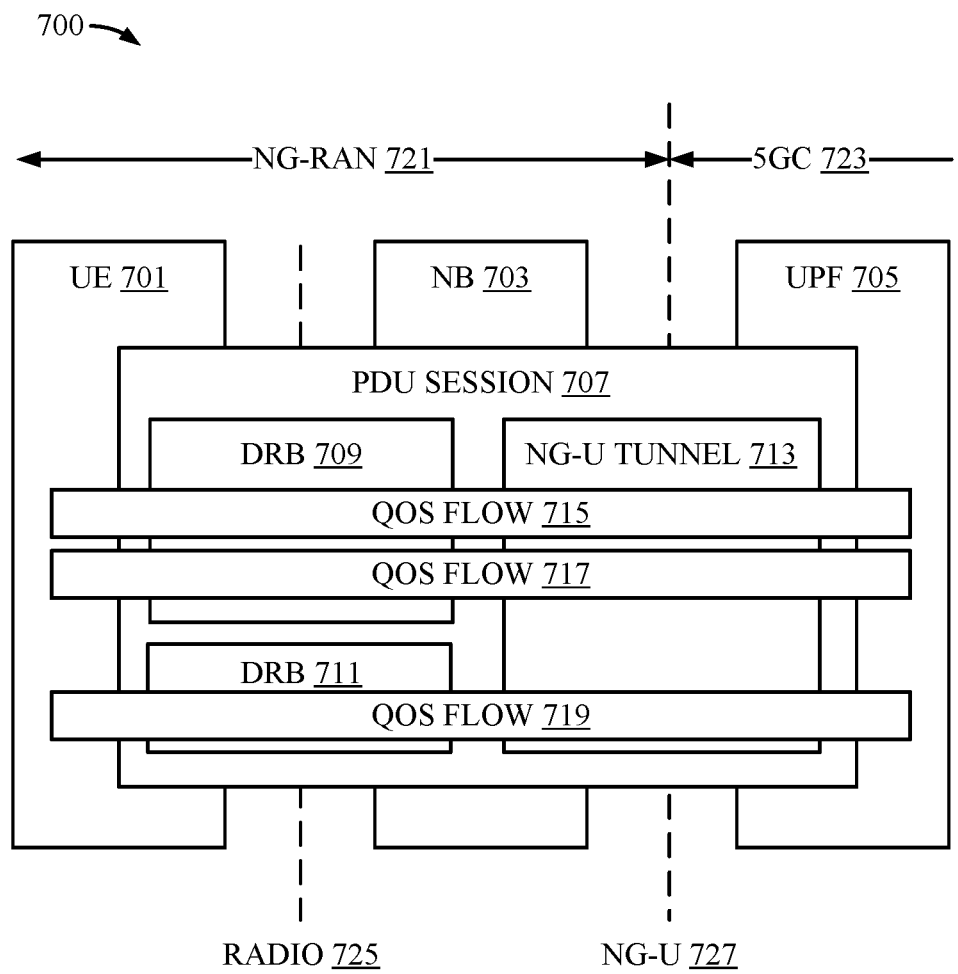
FIG. 7A depicts an example of a QoS architecture in a next generation radio access network.

FIG. 7A depicts an example of a QoS architecture 700 in a next generation radio access network (NG-RAN) 721, which is applicable to both new radio (NR) connected to a 5G core network (5GC) and for E-UTRA connected to 5GC. As depicted in FIG. 7A, for each user equipment (UE) 701, the 5GC 723 establishes one or more PDU sessions (e.g., 707). For each UE (e.g., 701), NG-RAN 721 establishes one or more data radio bearers (DRB) (e.g., 709 and 711) per PDU session (e.g., 707). The NG-RAN 721 further maps packets belonging to different PDU sessions (e.g., 707) to different DRBs (e.g., 709 and 711).

Generally, the NG-RAN 721 establishes at least one default DRB (e.g., 709 or 711) for each PDU session (e.g., 707). In this architecture, NAS level packet filters in the UE and in the 5GC associate uplink and downlink packets with QoS flows (e.g., 715, 717, and 719). Further, access stratum (AS)-level mapping rules in the UE and in NG-RAN 721 associate UL and DL QoS flows (e.g., 715, 717, and 719) with DRBs (e.g., 709 or 711).

NG-RAN 721 and 5GC 723 ensure quality of service (e.g., reliability and target delay) by mapping packets to appropriate QoS flows (e.g., 715, 717, and 719) and DRBs (e.g., 709 or 711). Hence, there is a two-step mapping of IP-flows to QoS flows (NAS) and from QoS flows to DRBs (AS) in the 5G quality of service (QoS) model.

At the NAS level, a QoS flow (e.g., 715, 717, and 719) is characterized by a QoS profile provided by 5GC 723 to NG-RAN 721 and QoS rule(s) provided by 5GC 723 to UE 701. The QoS profile is used by NG-RAN 721 to determine the treatment on radio interface 725 while the QoS rules dictates the mapping between uplink user plane traffic and QoS flows to UE 701. As above, a QoS flow may either be a guaranteed bitrate (GBR) or non-guaranteed bitrate (non-GBR), depending on its profile. The QoS profile of a QoS flow may contain QoS parameters, for instance, for each QoS flow (e.g., 715, 717, and 719). For example, the QoS parameters may include a 5G QoS identifier (5QI) and an allocation and retention priority (ARP). In in the case of a GBR QoS flow only, the QoS parameters may additionally include a guaranteed flow bit rate (GFBR) for both uplink and downlink, a maximum flow bit rate (MFBR) for both uplink and downlink, and a maximum packet loss rate for both uplink and downlink. And in the case of non-GBR QoS only, the QoS parameters may additionally include a reflective QoS attribute (RQA). The RQA, when included, indicates that some (not necessarily all) traffic carried on this QoS flow is subject to reflective quality of service (RQoS) at the NAS.

In addition, an aggregate maximum bit rate is associated to each PDU session (session-AMBR) and to each UE (UE-AMBR). The session-AMBR limits the aggregate bit rate that can be expected to be provided across all non-GBR QoS flows for a specific PDU session. The UE-AMBR limits the aggregate bit rate that can be expected to be provided across all non-GBR QoS flows of a UE.

The 5QI is associated to QoS characteristics giving guidelines for setting node specific parameters for each QoS flow. Standardized or pre-configured 5G QoS characteristics are derived from the 5QI value and are not explicitly signalled. Signalled QoS characteristics are included as part of the QoS profile. The QoS characteristics may include, for instance, resource type (GBR, delay critical GBR or Non-GBR), priority level, packet delay budget, packet error rate, averaging window, and maximum data burst volume.

At the AS level, the DRB (e.g., 709 or 711) defines the packet treatment on radio interface 725. A DRB (e.g., 709 or 711) serves packets with the same packet forwarding treatment. The QoS flow (e.g., 715, 717, or 719) to DRB (e.g., 709 or 711) mapping by NG-RAN 721 is based on QFI and the associated QoS profiles (i.e., QoS parameters and QoS characteristics). Separate DRBs (e.g., 709 and 711) may be established for QoS flows (e.g., 715, 717, and 719) requiring different packet forwarding treatment, or several QoS flows (e.g., 715, 717, and 719) belonging to the same PDU session (e.g., 707) can be multiplexed in the same DRB (e.g., 709 or 711).

In the uplink, NG-RAN 721 may control the mapping of QoS flows (e.g., 715, 717, and 719) to DRBs (e.g., 709 and 711) in different ways. First, NG-RAN 721 may implement reflective mapping in which for each DRB (e.g., 709 or 711), UE 701 monitors the QFI(s) of the downlink packets and applies the same mapping in the uplink; that is, for a DRB (e.g., 709 or 711), the UE 701 maps the uplink packets belonging to the QoS flows (e.g., 715, 717, and 719) corresponding to the QFI(s) and PDU session (e.g., 707) observed in the downlink packets for that DRB (e.g., 709 or 711). To enable this reflective mapping, NG-RAN 721 marks downlink packets over radio interface 725 with QFI. Second, NG-RAN may implement explicit configuration in which besides the reflective mapping, NG-RAN 721 may configure by RRC signaling an uplink "QoS flow to DRB mapping." Generally, UE 701 applies the latest update of the mapping rules, regardless of whether the update to the mapping rules is performed via reflecting mapping or explicit configuration.

In the downlink, the QFI is signaled by NG-RAN 721 over radio interface 725 for the purpose of RQoS and if neither NG-RAN 721, nor the NAS (as indicated by the RQA) intend to use reflective mapping for the QoS flow(s) (e.g., 715, 717, or 719) carried in a DRB (e.g., 709 or 711), then no QFI is signaled for that DRB (e.g., 709 or 711) over radio interface 725. In the uplink, NG-RAN 721 can configure UE 701 to signal QFI over radio interface 725.

For each PDU session (e.g., 707), a default DRB (e.g., 709 or 711) is configured. If an incoming uplink packet matches neither an RRC configured nor a reflective "QoS Flow ID to DRB mapping", the UE maps that packet to the default DRB (e.g., 709 or 711) of PDU session 707.

Within each PDU session (e.g., 707), it is up to NG-RAN 721 how to map multiple QoS flows (e.g., 715, 717, and/or 719) to a DRB (e.g., 709 or 711). NG-RAN 721 may map a GBR flow and a non-GBR flow, or more than one GBR flow to the same DRB (e.g., 709 or 711). The timing of establishing non-default DRB(s) between NG-RAN 721 and UE 701 for QoS flow configured during establishing a PDU session (e.g., 707) can be different from the time when the PDU session (e.g., 707) is established. NG-RAN 721 determines when non-default DRBs are established.

Figure 7B:
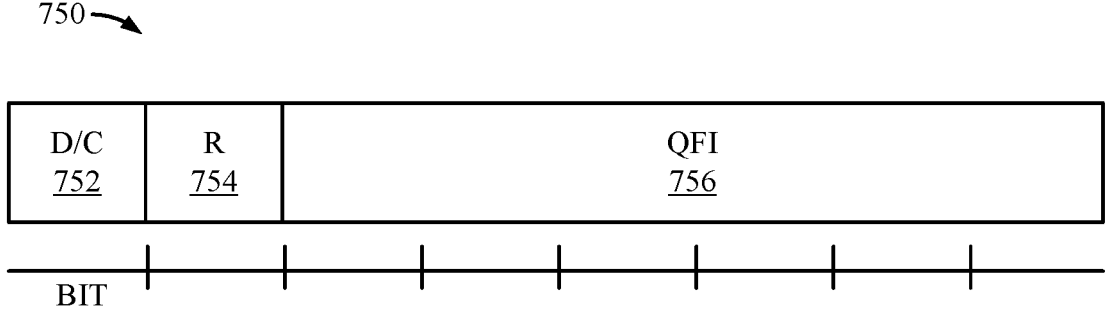
FIG. 7B depicts an example of a SDAP control PDU.

FIG. 7B depicts an example header 750 of a conventional SDAP PDU, which includes a "D/C" bit 752, an "R" bit 754, and QFI bits 756 (i.e., a QFI field of the SDAP header of the SDAP PDU), which together make up an octet of size one byte. In some cases, the "D/C" bit 752 indicates whether the SDAP PDU 750 is an SDAP data PDU or an SDAP control PDU. The R bit 754 is a reserved bit and, in some cases, may be set to zero. Additionally, the QFI bits 756 indicate the ID of the QoS flow to which the SDAP SDU 750 belongs. For example, in an uplink packet, QFI bits 756 may refer to a QoS flow with QFI=3.

Figure 8:
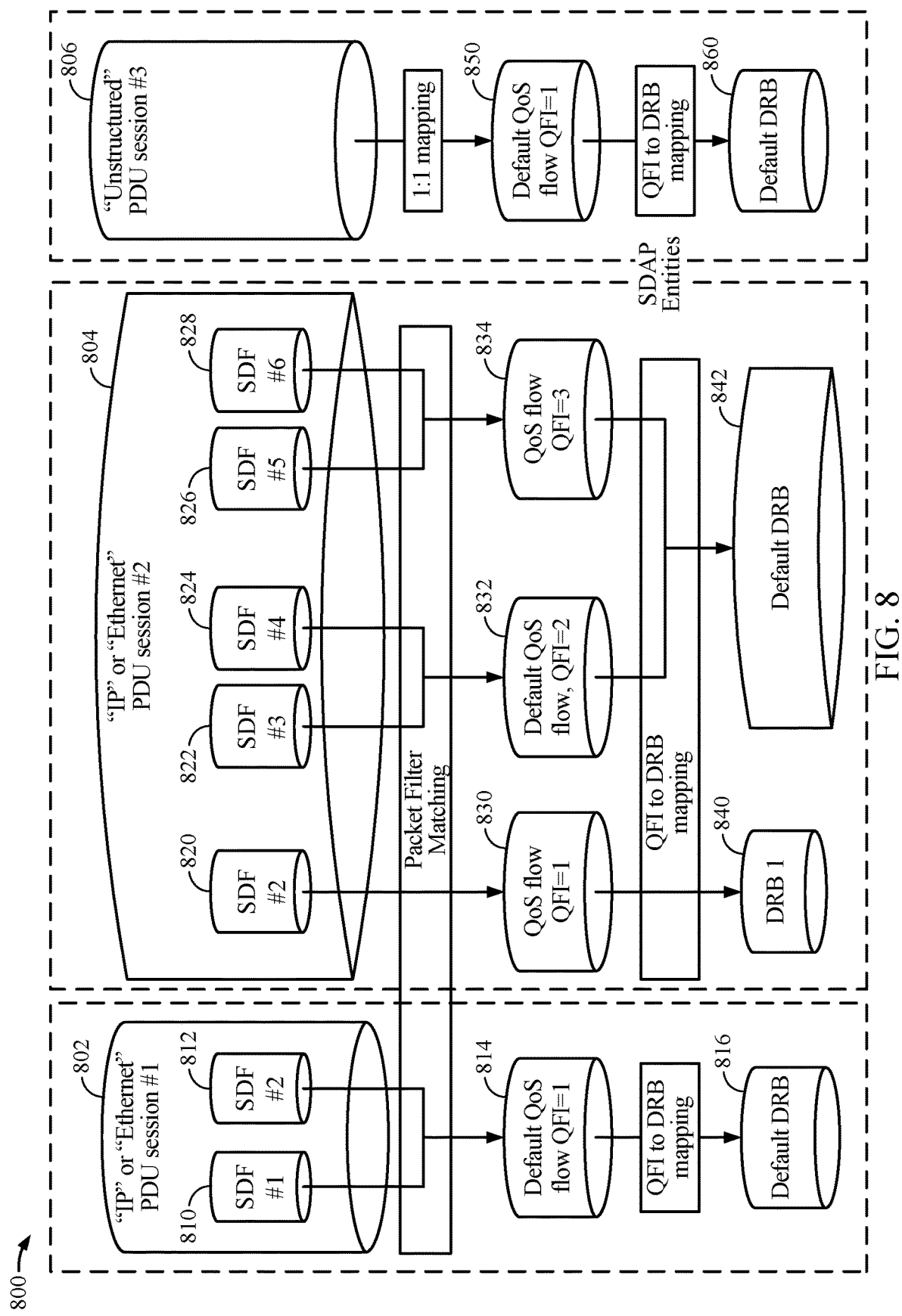
FIG. 8 illustrates an uplink mapping for end-to-end QoS enforcement, according to aspects of the present disclosure.

FIG. 8 illustrates an uplink mapping 800 for end-to-end QoS enforcement, according to aspects of the present disclosure. In the present disclosure, a service data flow (SDF) may be viewed as the data, packets, and/or frames from one set of applications on a smartphone, but the present disclosure is not so limited and applies to all types of SDFs in a wireless communications network. According to aspects of the present disclosure, a UE (e.g., UE 701 or UE 120) can have multiple PDU sessions 802, 804, and 806. In the PDU session 802, two SDFs 810 and 812 are established. Packets from both SDFs 810 and 812 are matched to the default QoS flow 814 for PDU session 802. The default QoS flow for PDU session 802 has a QoS flow identifier (QFI) of 1. The packets of the QoS flow are mapped to the default DRB 816 of the PDU session 802 for transmission. In the PDU session 804, five SDFs 820, 822, 824, 826, and 828 are established. Packets from SDF 820 are matched to the QoS flow 830, which has a QFI of 1. The packets of the QoS flow QFI=1 are mapped to the DRB 840 for transmission. Packets from SDFs 822 and 824 are matched to the default QoS flow 832 for PDU session 804. The default QoS flow for PDU session 804 has a QFI of 2. The packets of the QoS flow QFI=2 are mapped to the default DRB 842 of the PDU session 804 for transmission. Packets from SDFs 826 and 828 are matched to the QoS flow 834, which has a QFI of 3. The packets of the QoS flow QFI=3 are also mapped to the default DRB 842 of the PDU session 804 for transmission. In the unstructured PDU session 806, packets are mapped to the default QoS flow 850 for PDU session 806. The default QoS flow for the unstructured PDU session has a QFI=1. The packets of the QoS flow QFI=1 are mapped to the default DRB 860 of the PDU session 806 for transmission.

Figure 9:
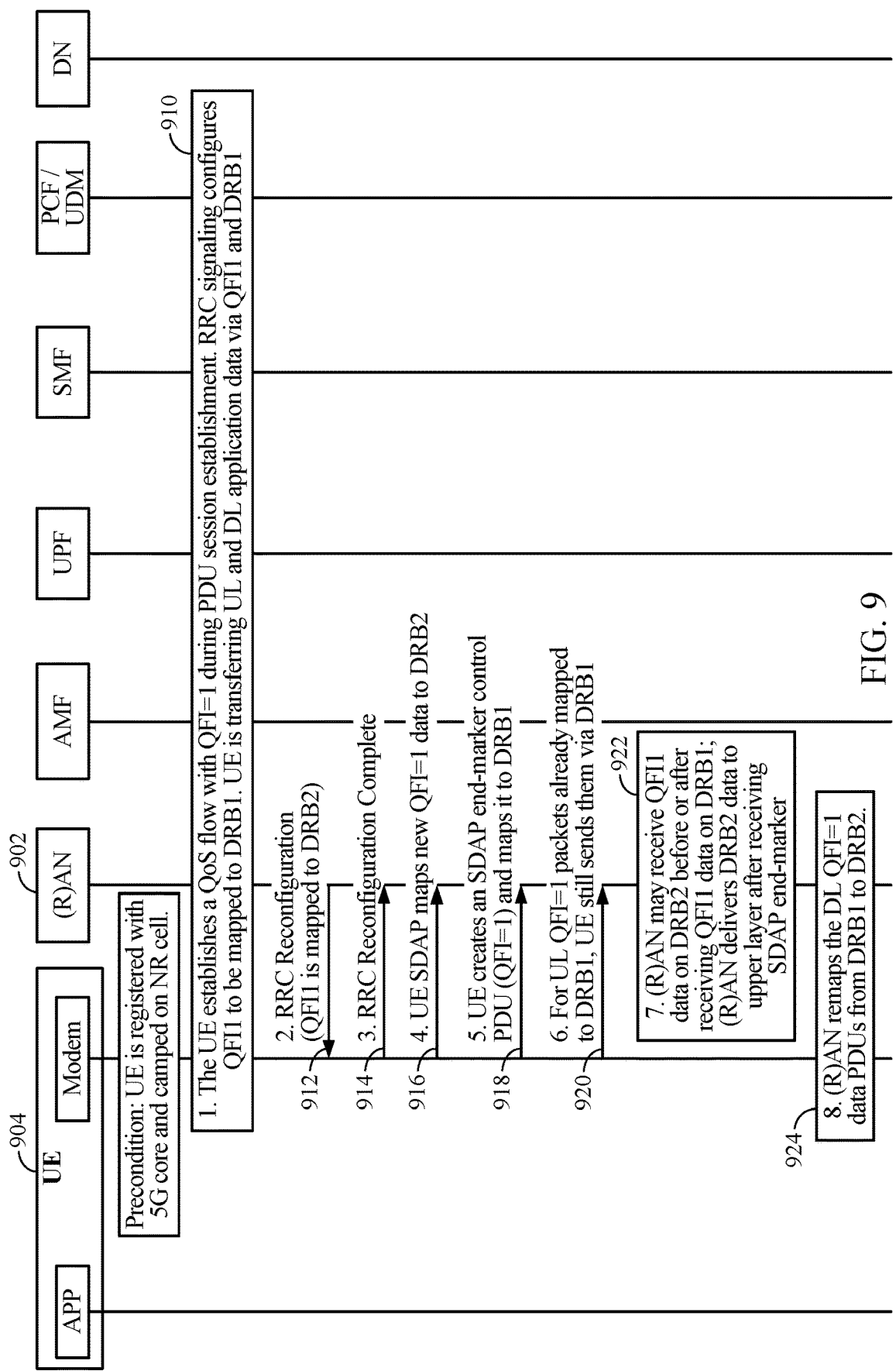
FIG. 9 is a diagram of a call flow when an NG-RAN configures a UE to change the AS mapping of an existing QoS flow from one DRB to another DRB, according to aspects of the present disclosure.
Figure 10:
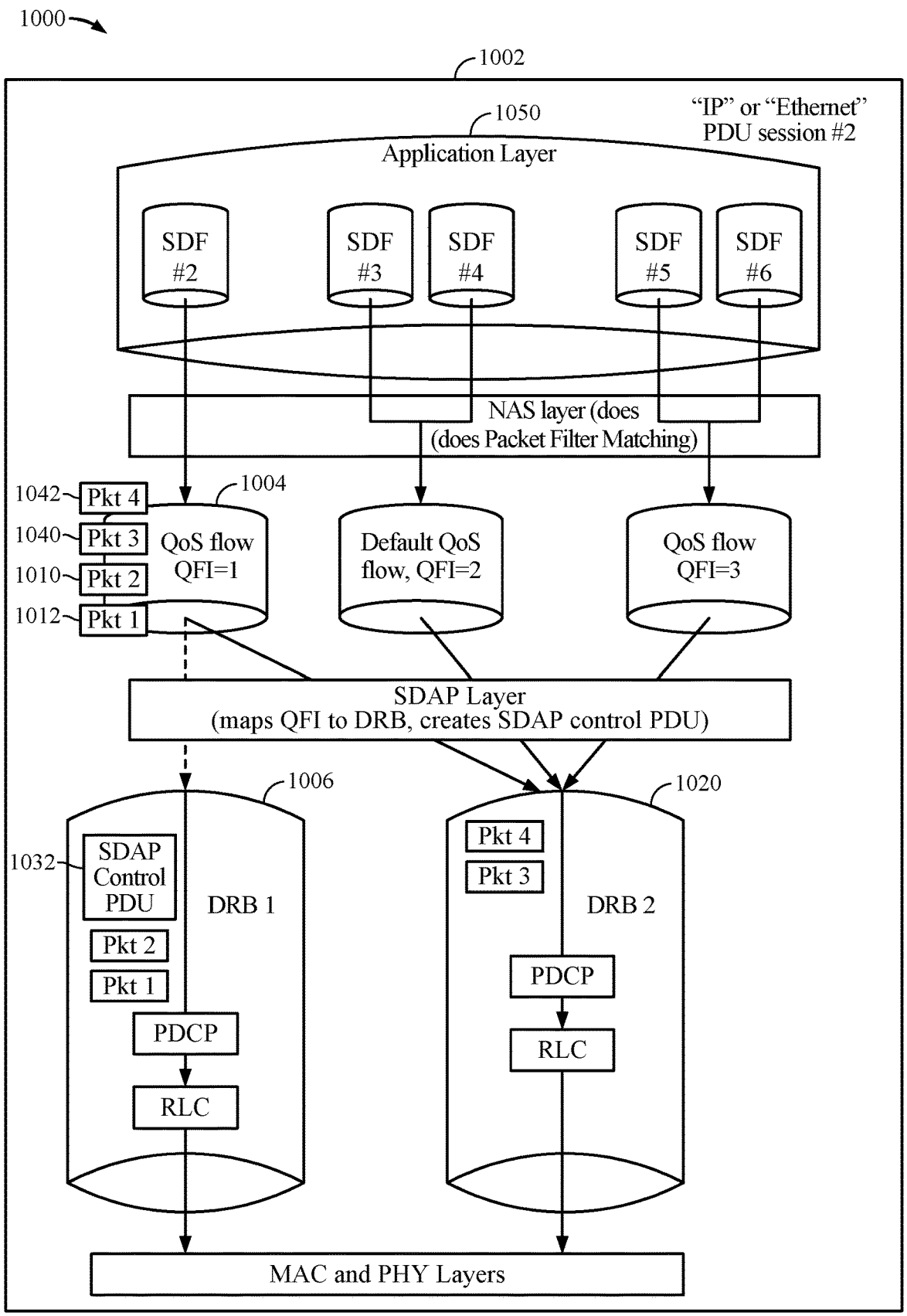
FIG. 10 is a diagram illustrating an uplink mapping during the operations illustrated with the call flow shown in FIG. 9, according to aspects of the present disclosure.

FIG. 9 is a diagram 900 of a call flow when an NG-RAN 902 configures a UE 904 to change the AS mapping of an existing QoS flow from one DRB to another DRB, via RRC signalling. The configuration change and packet flows are illustrated in FIG. 10, described below. UE 120 (shown in FIGS. 1 and 4) may be an example of UE 904, and the components of UE 120 shown in FIG. 4 may perform operations described in the call flow diagram 900.

The call flow shown in diagram 900 begins with the UE 904 in RRC Connected mode, registered with the 5G core network, and camped on an NR cell. The UE has established a PDU session with PDU session type of IPv4, IPv6, IPv4v6, or Ethernet. At 910, the UE establishes a QoS flow with QFI=1 during PDU session establishment. RRC signaling (e.g., from the NG-RAN) configures a QoS flow, QFI1, to be mapped to a first DRB, DRB1. The UE transfers UL and DL application data via QFI1 and DRB1.

At 912, The NG-RAN sends an RRC reconfiguration message to the UE. The RRC reconfiguration message contains a new mapping such that QFI1 is mapped to a second DRB, DRB2. The new QFI to DRB mapping is conveyed via an information element (IE): RadioBearer-Config->DRB-ToAddMod->sdap-Config. The UE sends an RRC Reconfiguration Complete message to acknowledge the NG-RAN's RRC message at 914.

Next, at 916, the UE SDAP layer maps all new QFI1 uplink data to DRB2. That is, data arriving at the UE SDAP layer is mapped to DRB2, according to the new QFI to DRB mapping. Thus, in the remainder of the call flow 900, packets of QFI1 (e.g., Pkt-3 and Pkt-4) are mapped to DRB2.

At 918, after the UE has confirmed that no new QFI1 uplink data is mapped to DRB1, the UE creates an SDAP control PDU for QFI1 and puts the SDAP control PDU into the DRB1 layer-2 transmission buffer. The SDAP control PDU is the last PDCP PDU of QFI1 in DRB 1. In FIG. 10, the SDAP control PDU is put after Pkt-2 in DRB1. According to aspects of the present disclosure, the PDCP entity in the UE cannot differentiate the SDAP control PDU from an SDAP data PDU, so both are treated in the same way by PDCP and their order is preserved by the PDCP layer, i.e., the PDCP layer will ensure that the SDAP control PDU is the last PDCP PDU for QFI1 in DRB1. Therefore, the SDAP control PDU serves as the end-marker in the QFI re-mapping.

Then, at 920, the UE may have already mapped some QFI1 uplink data to DRB1 (e.g., Pkt-1 and Pkt-2, shown in FIG. 10) and put the QFI1 uplink data into the layer-2 transmission buffer of DRB1. The UE still transmits all such QFI1 data via DRB 1. In FIG. 10, Pkt-1 and Pkt-2 are already mapped to DRB1.

At 922, due to hybrid automatic retransmission request (HARM) and logical channel prioritization (LCP) (e.g., DRB2 may be higher priority than DRB1 in MAC layer scheduling), NG-RAN may receive the DRB2 data described at 920 before receiving the DRB1 data described at 916, but the NG-RAN begins delivering DRB2 data to upper layers only after receiving the SDAP end-marker control PDU mentioned above. This means that the NG-RAN delivers all DRB1 data to upper layers before delivering any DRB2 data, for QFI1 in the uplink. In FIG. 10, Pkt-3 and Pkt-4 (from DRB2) may be received by the NG-RAN earlier than Pkt-1, Pkt-2, or the SDAP control PDU. However, the NG-RAN will deliver Pkt-3 to upper layers only after the SDAP control PDU is received.

At 924, the NG-RAN re-maps the DL QFI=1 data from DRB1 to DRB2, which is up to NG-RAN implementation. This can happen at any time in the call flow.

According to aspects of the present disclosure, the UE uses an SDAP end-marker control PDU to indicate that the configuration change has been applied. During the call flow, the old DRB (DRB1) is not released.

FIG. 10 is a diagram 1000 illustrating an uplink mapping during the operations illustrated with the call flow 900, shown in FIG. 9. When the operations begin, the UE 1002 establishes a QoS flow 1004 with QFI=1 (i.e., QFI1) during PDU session establishment. RRC signaling (e.g., from the NG-RAN) configures the QoS flow, QFI1, to be mapped to a first DRB 1006, DRB1. The UE transfers UL and DL application data (e.g., Pkt-1 1010 and Pkt-2 1012) from an application layer 1050 via QFI1 and DRB1. As mentioned above with reference to 912 in FIG. 9, the UE receives an RRC reconfiguration message that contains a new mapping such that QFI1 is mapped to a second DRB 1020, DRB2. A service data adaptation protocol (SDAP) layer 1030 at the UE creates an SDAP control PDU 1032 for QFI1 and puts the SDAP control PDU into the DRB1 layer-2 transmission buffer. The application layer generates additional application data, packets Pkt-3 1040 and Pkt-4 1042. The SDAP layer maps packets Pkt-3 and Pkt-4 to DRB2, according to the new mapping received in the RRC reconfiguration message.

Example Avoiding Out of Order Uplink Data Reception Upon DRB Release, Handover To Another DRB, or QOS Flow Addition According to aspects of the present disclosure, some DRBs (e.g., DRB1, shown in FIG. 10) may be released while there are still residual UL SDAP data PDUs in the UE buffers of the released DRBs. The DRBs may be released due to, e.g., handover from a 5G network that uses SDAP headers on PDUs to a 4G or 3G network that does not use SDAP headers on PDUs, PDU session user plane deactivation (i.e., all DRBs of an existing PDU session are released), RRC release (i.e., a command from the network to release the DRB), or radio link failure (RLF). The UE may then perform a relevant procedure to establish DRBs again. For example, a UE has data to transmit via a DRB, DRB1, and the UE is assigned a new DRB, DRB2. DRB1 and DRB2 can have different configurations. For example, in a first configuration for data of two QoS flows, QFI1 and QFI2, DRB1 is configured to use uplink SDAP headers, and both QFI1 and QFI2 are mapped to DRB1. In the example, the UE receives a new configuration for the QFI1 and QFI2 data. In the new configuration, a new DRB, DRB2, is configured with no uplink SDAP header; QFI1 is mapped to DRB2; another new DRB, DRB3, is configured to not use uplink SDAP headers; and QFI2 is mapped to DRB3. In the example, one problem is that the QFI1 and QFI2 data packets in DRB1's buffer are formatted based on the old configuration (i.e., DRB1's configuration). Such QFI1 packets cannot be directly transmitted via DRB2, because their format is not compliant with DRB2's configuration and the receiver cannot process these packets correctly if they are directly transmitted via DRB2. In the example, a second problem is that, according to the new configurations, QFI1 packets can only be transmitted via the PDCP entity for DRB2, and QFI2 packets can only be transmitted via the PDCP entity for DRB3. However, QFI1 packets and QFI2 packets may be mixed in the same buffer of DRB1. The lower layer (PDCP layer) of the protocol stack does not know which packets are from the QFI1 QoS flow and which packets are from the QFI2 QoS flow.

In previously known techniques, a UE discards UL data packets in the released DRB if a new configured DRB has a different UL SDAP header configuration (e.g., the released DRB uses SDAP headers and the new DRB does not use SDAP headers) and a different QFI-to-DRB mapping than the released DRB. Also, in previously known techniques, if the old configuration uses UL SDAP headers and the new configuration does not use UL SDAP headers, then the receiving gNB treats the SDAP headers (i.e., from the packets configured using the old configuration) as user data, and hence, the upper layer (e.g., TCP/UDP/IP) protocol will find the data format invalid and discard the packets. In addition, in previously known techniques, the UL data may be out of order at the receiver side, due to the previously mentioned packet discarding. Thus, it is desirable to develop techniques to avoiding out of order uplink data reception upon DRB release or handover to another DRB.

Figure 11:
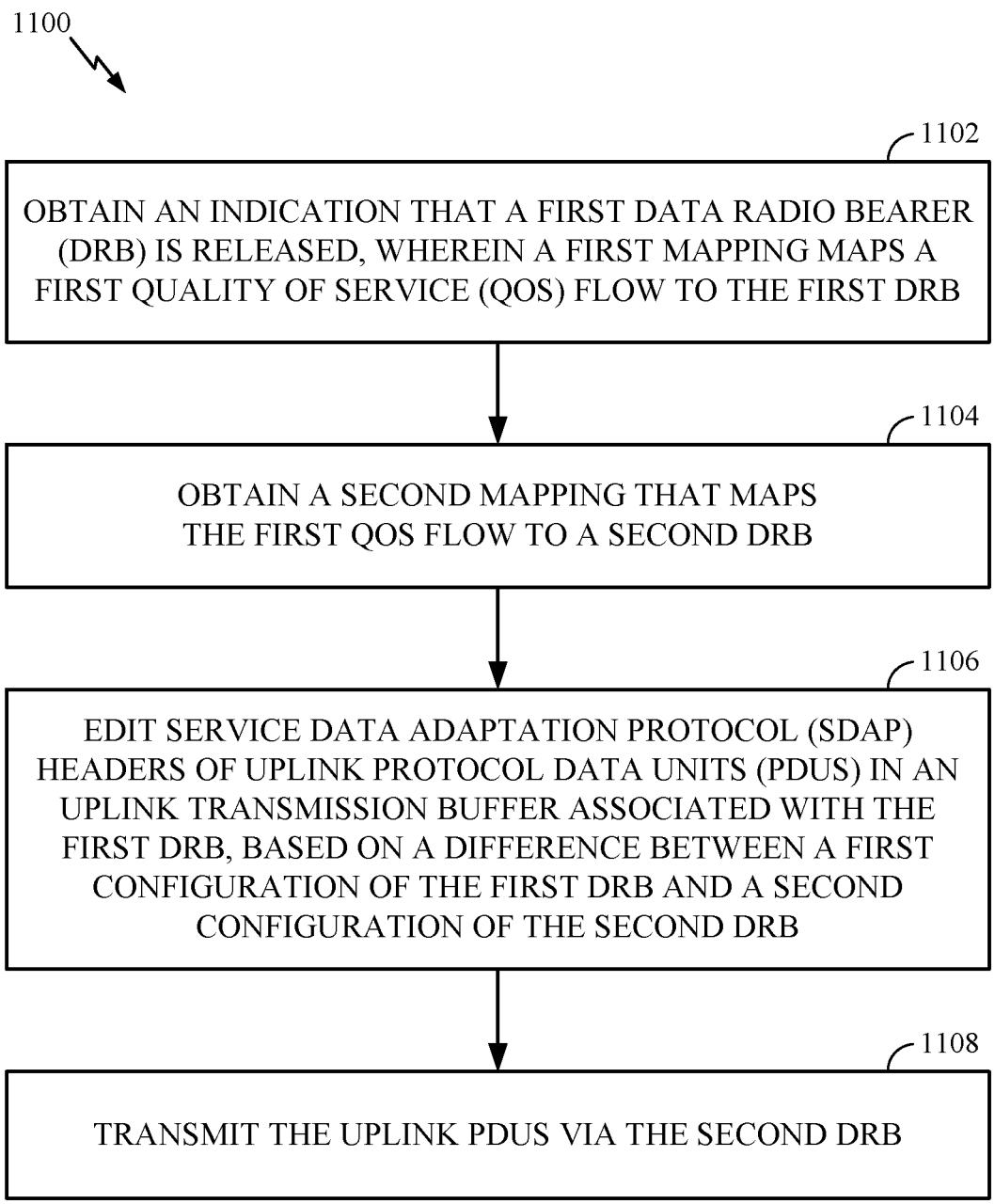
FIG. 11 is a flow diagram illustrating operations for wireless communications that may be performed by a UE to avoid out of order uplink data reception upon DRB release, according to aspects of the present disclosure.

FIG. 11 is a flow diagram illustrating operations 1100 for wireless communications that may be performed by a UE (e.g., UE 120, shown in FIGS. 1 and 4), to avoid out of order uplink data reception upon DRB release, in accordance with aspects of the present disclosure.

At block 1102, operations 1100 begin with the UE obtaining an indication that a first data radio bearer (DRB) is released, wherein a first mapping maps a first quality of service (QoS) flow to the first DRB. For example, UE 120 (shown in FIGS. 1 and 4) is initially connected to a 4G core network (e.g., a 4G network operated via BS 110a, shown in FIG. 1) via a first DRB (DRB1) that is a 4G DRB that is configured to not use uplink SDAP headers on PDUs and the UE receives a handover (HO) command to handover to a 5G core network (e.g., a 5G network operated via BS 110b, shown in FIG. 1). Receiving the handover command is an example of a UE obtaining an indication that a first DRB is released.

Operations 1100 continue at block 1104 with the UE obtaining a second mapping that maps the first QoS flow to a second DRB. Continuing the example from above, the UE is configured by the network (e.g., in the HO command) to map DRB1 (i.e., the first DRB) to a QoS flow of a second DRB (DRB2, e.g., a 5G DRB that is configured to use SDAP headers on PDUs).

At block 1106, operations 1100 continue with the UE editing service data adaptation protocol (SDAP) headers of uplink protocol data units (PDUs) in an uplink transmission buffer associated with the first DRB, based on a difference between a first configuration of the first DRB and a second configuration of the second DRB. Continuing the example from above, the UE edits each SDAP PDU in a transmission buffer of the UE that was previously mapped to DRB1 by adding an SDAP header to that PDU. The UE may move the edited PDUs (i.e., the PDUs with the added SDAP headers) to the transmission buffer for DRB2. The UE then transmits the edited PDUs via DRB2.

Operations 1100 continue at block 1108 with the UE transmitting the uplink PDUs via the second DRB. Continuing the example from above, the UE transmits the edited PDUs (i.e., the PDUs with the added SDAP headers) via the second DRB (DRB2).

A UE performing operations 1100 (described above with reference to FIG. 11) is described in the following example. A UE (e.g., UE 120, shown in FIG. 1) is initially connected to a 5G core network (e.g., a 5G network operated via BS 110a, shown in FIG. 1) via a 5G DRB (DRB1). The UE then hands over to a 4G core network (e.g., a 4G network operated via BS 110b, shown in FIG. 1). The UE is configured by the network to map the QoS flows of 5G DRB1 to a 4G DRB (e.g., 4G DRB2). DRB1 is configured to use uplink SDAP headers on SDAP PDUs, while DRB2 is configured to not use SDAP headers on PDUs. In this example, the UE can perform operations 1100, to edit each SDAP PDU mapped to DRB1 in the UE transmission buffer by removing an SDAP header from that PDU, and then move the edited PDUs (i.e., the PDUs after they have had the SDAP headers removed) to a transmission buffer for DRB2, prior to transmitting the edited PDUs via DRB2.

According to aspects of the present disclosure, a UE performing operations 1100 does not discard UL data packets in the released DRB (i.e., the first DRB of block 1102) if a new configured DRB has a different UL SDAP header configuration and QFI-to-DRB mapping than the released DRB. Because the UE does not discard UL data, the UL data is received in order (i.e., in the correct sequence) at the receiver side.

In aspects of the present disclosure, if the first configuration of the first DRB (i.e., the first configuration in block 1106) indicates that uplink SDAP PDUs do not have SDAP headers (e.g., the first DRB is a DRB of a 3G or 4G network) and the second configuration of the second DRB (i.e., the second configuration in block 1106) indicates that uplink SDAP PDUs have SDAP headers (e.g., the second DRB is a DRB of a 5G network), then for each existing UL SDAP data PDU in a DRB uplink buffer of the UE, the UE adds an uplink SDAP header to the SDAP data PDU; sets the "QFI" field of the UL SDAP header to the QFI value of the QoS flow (i.e., the QoS flow in block 1102); sets other fields of the added UL SDAP header based on a related specification, such as 3GPP TS.37.324; and transmits the updated UL SDAP data PDU via the second DRB.

According to aspects of the present disclosure, if the first configuration of the first DRB (i.e., the first configuration in block 1106) indicates that uplink SDAP PDUs have SDAP headers and the second configuration of the second DRB (i.e., the second configuration in block 1106) indicates that uplink SDAP PDUs do not have SDAP headers, then for each existing UL SDAP data PDU in a DRB uplink buffer of the UE, the UE removes uplink SDAP headers from the SDAP data PDU and transmits the updated UL SDAP data PDU via the second DRB.

In previously known techniques, a UE may receive a NAS PDU session modification command to add a new QoS flow, QFI1, (i.e., the UE does not have the QoS flow before getting the NAS PDU session modification command), by adding one or multiple QoS rules associated with QFI1, and the UE may send packets out of order by using the rules associated with QFI1 before the UE obtains a QFI-to-DRB mapping rule for QFI1. This may occur when the gNB does not configure a QFI-to-DRB mapping at exactly the same TTI as the network configures the UE with new QoS flows, which can happen frequently, since these two configurations may come from different network entities. In previously known techniques, when the UE receives a NAS PDU session modification command to add a new QoS flow (QFI1) before the UE obtains a QFI-to-DRB mapping rule for QFI1, the UE will map QFI1 to the default DRB. When the RRCReconfiguration message containing a configuration to map QFI1 to another DRB (e.g., DRB2) is received by the UE, then the UE locally remaps QFI1 to the other DRB (DRB2). However, the network may not expect such a remapping. In-order delivery is only tracked within a DRB, but QFI1 packets are transmitted over both DRB1 and DRB2 during the remapping transition time, and hence data packets of QFI1 may be received out of their original order. It is therefore desirable to develop techniques to avoid out of order uplink data reception upon QoS flow addition.

Figure 12:
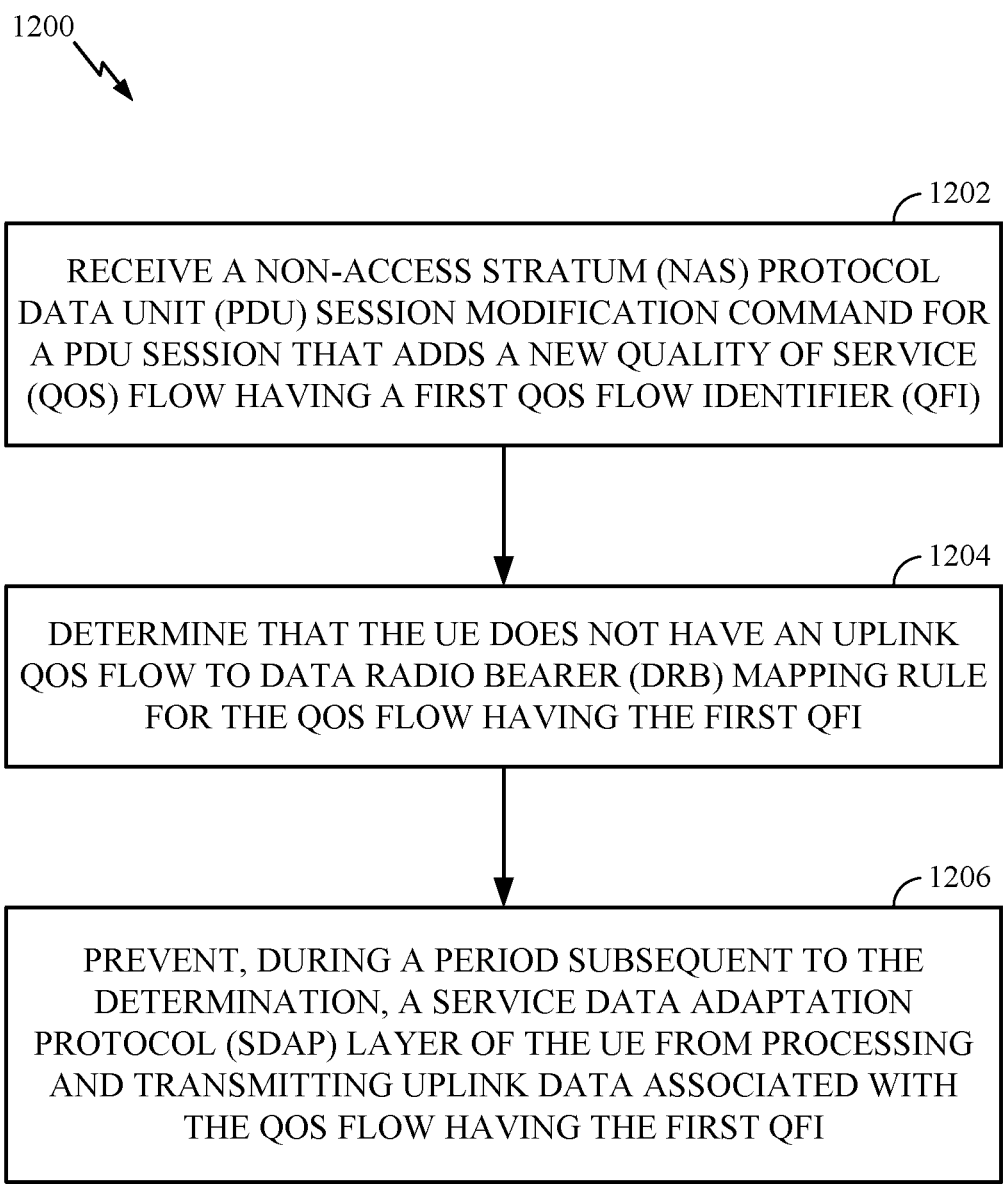
FIG. 12 is a flow diagram illustrating operations for wireless communications that may be performed by a UE to avoid out of order uplink data reception upon QoS flow addition, according to aspects of the present disclosure.

FIG. 12 is a flow diagram illustrating operations 1200 for wireless communications that may be performed by a UE (e.g., UE 120, shown in FIGS. 1 and 4) to avoid out of order uplink data reception upon QoS flow addition.

At block 1202, operations 1200 begin with the UE receiving a non-access stratum (NAS) protocol data unit (PDU) session modification command for a PDU session that adds a new quality of service (QoS) flow having a first QoS flow identifier (QFI). For example, UE 120 (shown in FIG. 1) receives a NAS PDU session modification command message for a PDU session that adds a new QoS flow with a QFI=2 (i.e., a first QFI).

Operations 1200 continue at block 1204 with the UE determining that the UE does not have an uplink QoS flow to data radio bearer (DRB) mapping rule for the QoS flow having the first QFI. Continuing the example from above, the UE determines that the UE does not have an uplink QoS flow to DRB mapping rule for the QoS with QFI=2.

Operations 1200 continue at block 1206 with the UE, preventing, during a period subsequent to the determination, a service data adaptation protocol (SDAP) layer of the UE from processing and transmitting uplink data associated with the QoS flow having the first QFI. Continuing the example from above, the UE, while the first timer is counting down the period, prevents an SDAP layer of the UE from processing and transmitting uplink data associated with the QoS flow having QFI=2.

According to aspects of the present disclosure, a UE performing operations 1200 may cause a receiver to receive packets of the QoS flow having the first QFI of block 1202 in the packets' original order.

In aspects of the present disclosure, a UE performing operations 1200 may receive a QoS flow to DRB mapping rule for the QoS flow having the first QFI (i.e., the QoS flow in block 1202). The UE may then process and transmit uplink data associated with the QoS flow having the first QFI using the received QoS flow to DRB mapping rule.

According to aspects of the present disclosure, a UE performing operations 1200 may, at the end of the period (i.e., the period in block 1206), determine a QoS flow to DRB mapping rule for the QoS flow having the first QFI (i.e., the QoS flow in block 1202).

In aspects of the present disclosure, a UE performing operations 1200 may start a timer at the beginning of the period (i.e., the period in block 1204) and determine that the period ends when the timer expires.

In aspects of the present disclosure, a UE determining a QoS flow to DRB mapping rule for the QoS flow having the first QFI (i.e., the QoS flow in block 1202) may determine the DRB mapping rule to be to map PDUs of the QoS flow having the first QFI to a default DRB of the PDU session.

According to aspects of the present disclosure, a UE determining a QoS flow to DRB mapping rule for the QoS flow having the first QFI (i.e., the QoS flow in block 1202) may determine that the PDU session does not have a default DRB and then determine the DRB mapping rule to be to map PDUs of the QoS flow having the first QFI to a non-default DRB of the PDU session.

In previously known techniques, if a PDU session has non-default DRBs and no default DRB, and at least one QoS flow of the PDU session has no QoS flow to DRB mapping rule configured, then UE behavior is not defined, and the UE will typically discard uplink user data of the QoS flow(s) which are not mapped to a DRB. While this is a network error and should be rare in a well-configured 5G standalone (SA) network, it may happen in initial SA deployments where the network configuration may be not optimal. It is therefore desirable to develop techniques to prevent a UE from discarding uplink user data under these conditions.

Figure 13:
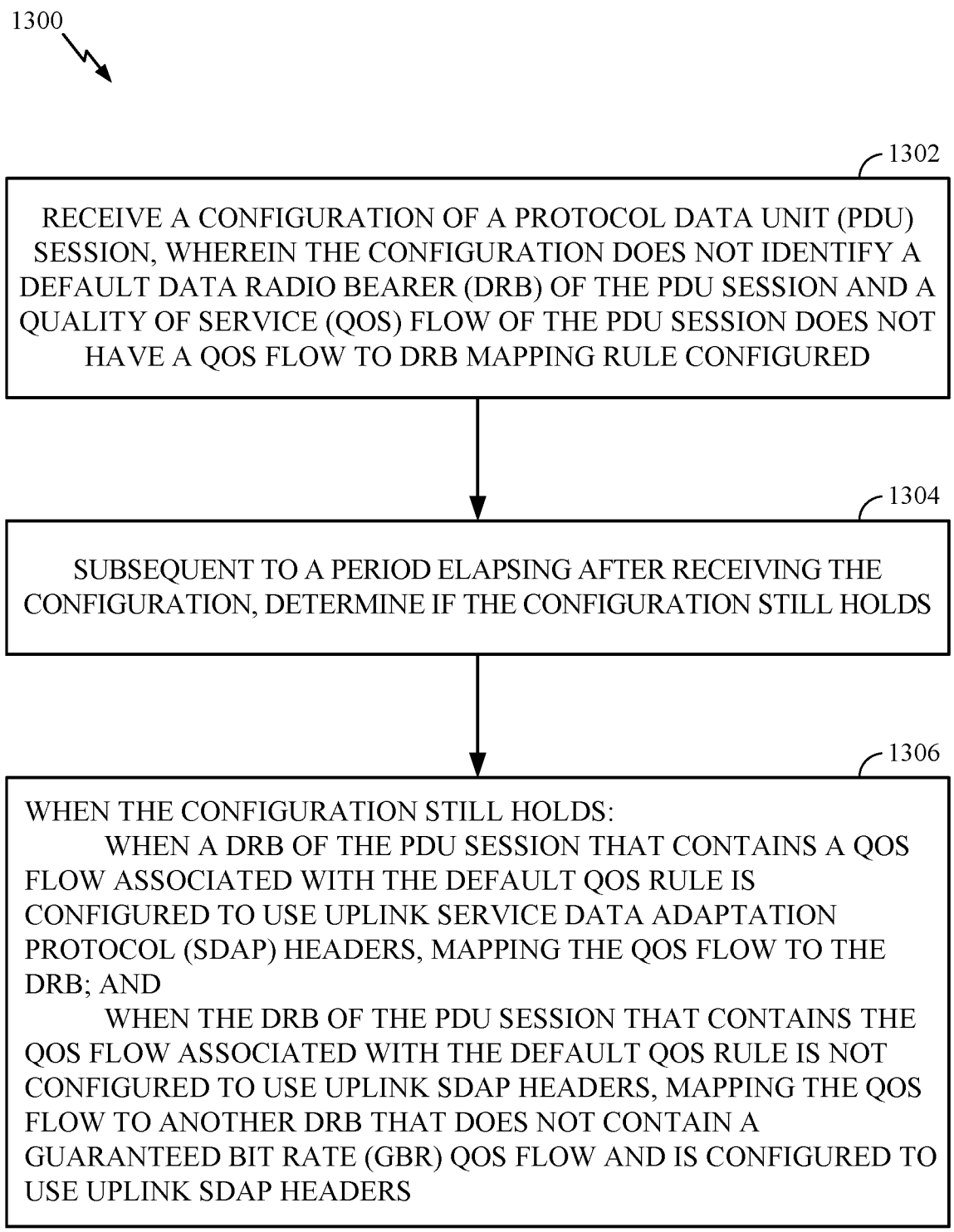
FIG. 13 is a flow diagram illustrating operations for wireless communications that may be performed by a UE to avoid discarding UL user data when the UE has a PDU session having non-default DRBs and no default DRB and at least one QoS flow that is not mapped to a DRB, according to aspects of the present disclosure.

FIG. 13 is a flow diagram illustrating operations 1300 for wireless communications that may be performed by a UE (e.g., UE 120, shown in FIGS. 1 and 4) to avoid discarding UL user data when the UE has a PDU session having non-default DRBs, no default DRB, and at least one QoS flow that is not mapped to any DRB, according to aspects of the present disclosure.

At block 1302, operations 1300 begin with the UE receiving a configuration of a protocol data unit (PDU) session, wherein the configuration does not identify a default data radio bearer (DRB) of the PDU session and a quality of service (QoS) flow of the PDU session does not have a QoS flow to DRB mapping rule configured. For example, UE 120 (shown in FIGS. 1 and 4) receives a configuration of a PDU session (e.g., for a web-browsing application), wherein the configuration does not identify a default DRB of the PDU session and a QoS flow of the PDU session does not have a QoS flow to DRB mapping rule configured.

At block 1304, operations 1300 continue with the UE, subsequent to a period elapsing after receiving the configuration, determining if the configuration still holds. Continuing the example from above, when the timer (i.e., the timer started in block 1304) expires, the UE determines if the configuration (i.e., the configuration received in block 1302) still holds (e.g., the UE determines if a replacement configuration has been received).

Operations 1300 continue at block 1306 with the UE, when the configuration still holds: when a DRB of the PDU session that contains a QoS flow associated with the default QoS rule is configured to use uplink service data adaptation protocol (SDAP) headers, mapping the QoS flow to the DRB, and when the DRB of the PDU session that contains a QoS flow associated with the default QoS rule is not configured to use uplink SDAP headers, mapping the QoS flow to another DRB that does not contain a guaranteed bit rate (GBR) QoS flow and is configured to use uplink SDAP headers. Continuing the example from above, if the UE determined the configuration still held in block 1306, then: when a DRB of the PDU session that contains a QoS flow associated with the default QoS rule is configured to use uplink service data adaptation protocol (SDAP) headers, the UE maps the QoS flow (i.e., the QoS flow in block 1302 that does not have a QoS flow to DRB mapping rule configured) to the DRB (i.e., the DRB that is configured to use uplink SDAP headers and contains a QoS flow associated with the default QoS rule), and when the DRB of the PDU session that contains a QoS flow associated with the default QoS rule is not configured to use uplink SDAP headers, mapping the QoS flow (i.e., the QoS flow in block 1302 that does not have a QoS flow to DRB mapping rule configured) to another DRB that does not contain any guaranteed bit rate (GBR) QoS flow and is configured to use uplink SDAP headers.

According to aspects of the present disclosure, a UE performing operations 1300 will not discard uplink user data when:
(1) the UE has a PDU session that has non-default DRBs and no default DRB and
(2) at least one QoS flow of the PDU session has no mapped DRB configured.

According to aspects of the present disclosure, a UE performing operations 1300 may determine the length of the period (i.e., the period in block 1304) based on a wireless network communications standard.

According to aspects of the present disclosure, a UE performing operations 1300 may determine the length of the period (i.e., the period in block 1304) based on a configuration received from the network (i.e., received from a base station).

In aspects of the present disclosure, a UE performing operations 1300 may start a timer at the beginning of the period (i.e., the period in block 1304) and determine that the period ends when the timer expires.

Example Communication Device

Figure 14:
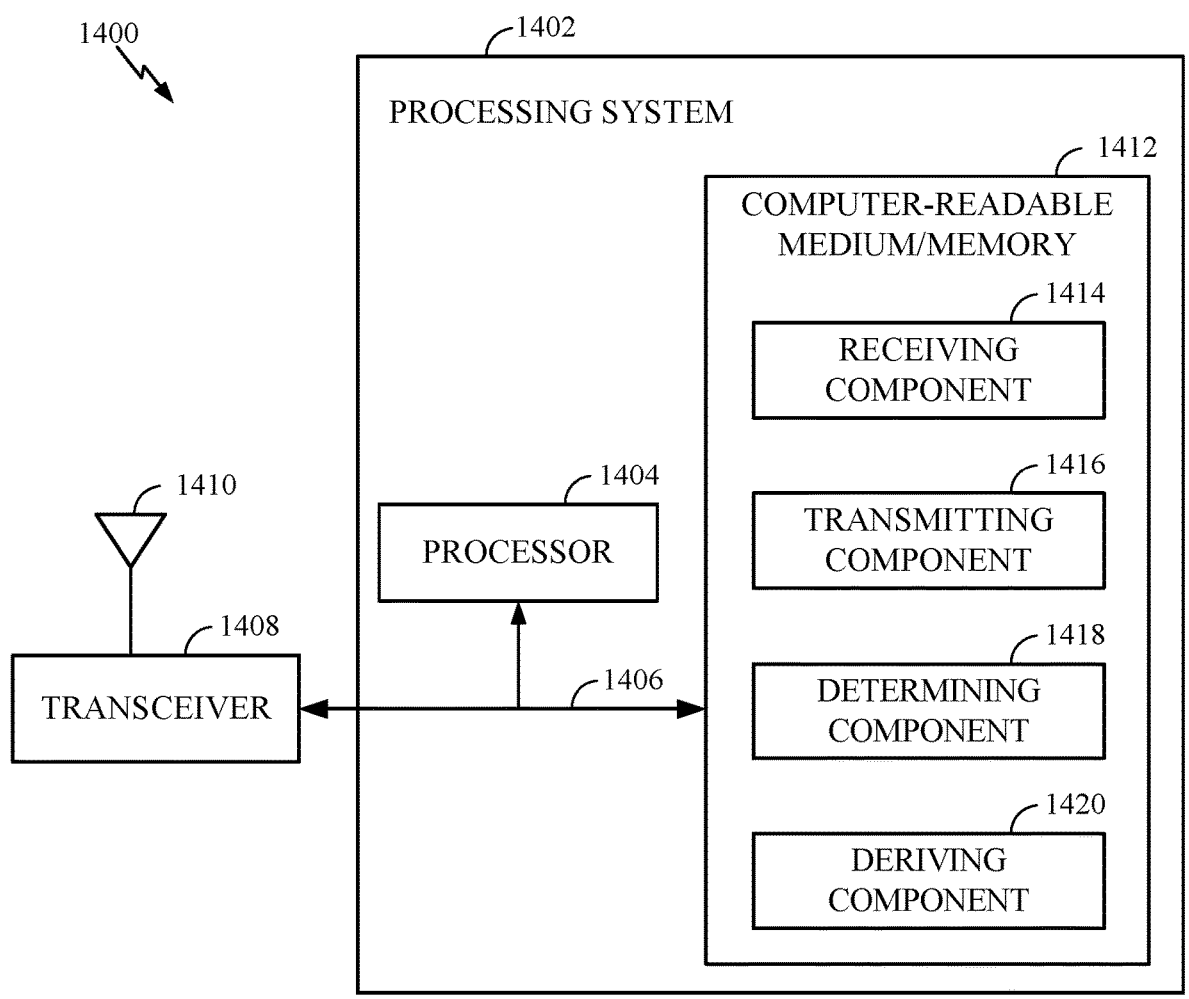
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIGS. 11, 12, and 13. The communications device 1400 includes a processing system 1402 coupled to a transceiver 1408. The transceiver 1408 is configured to transmit and receive signals for the communications device 1400 via an antenna 1410, such as the various signal described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions that when executed by processor 1404, cause the processor 1404 to perform the operations illustrated in FIGS. 11, 12, and 13, or other operations for performing the various techniques discussed herein.

In certain aspects, the processing system 1402 further includes a receiving component 1414 for performing the operations illustrated in FIGS. 11, 12, and 13. Additionally, the processing system 1402 includes a transmitting component 1416 for performing the operations illustrated in FIGS. 11, 12, and 13. Additionally, the processing system 1402 includes a determining component 1418 for performing the operations illustrated in FIGS. 11, 12, and 13. Additionally, the processing system 1402 includes a deriving component 1420 for performing the operations illustrated in FIGS. 11, 12, and 13. The receiving component 1414, transmitting component 1416, determining component 1418, and deriving component 1420 may be coupled to the processor 1404 via bus 1406. In certain aspects, the receiving component 1414, transmitting component 1416, determining component 1418, and deriving component 1420 may be hardware circuits. In certain aspects, the receiving component 1414, transmitting component 1416, determining component 1418, and deriving component 1420 may be software components that are executed and run on processor 1404.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The preceding description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11, 12, and 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:
1. A method of wireless communications, comprising:
   obtaining an indication that a first data radio bearer (DRB) is released, wherein a first mapping maps a quality of service (QoS) flow to the first DRB, wherein the first DRB is configured, in a first configuration, not to use uplink service data adaptation protocol (SDAP) headers;

obtaining a second mapping that maps the first QoS flow to a second DRB, wherein the second DRB is configured, in a second configuration, to use SDAP headers;

editing uplink protocol data units (PDUs) in an uplink transmission buffer associated with the first DRB, based on a difference between the first configuration of the first DRB and the second configuration of the second DRB, wherein editing of the uplink PDUs in the uplink transmission buffer associated with the first DRB comprises:

adding an SDAP header to each of the uplink PDUs; and moving the uplink PDUs with the added SDAP headers from the uplink transmission buffer associated with the first DRB to an uplink transmission buffer associated with the second DRB; and transmitting the uplink PDUs via the second DRB.

2. The method of claim 1, wherein:
editing the uplink PDUs further comprises setting a QoS flow identifier (QFI) field in each of the SDAP headers to a QFI value of the first QoS flow.

3. The method of claim 2, wherein:
the first DRB is served by a first base station (BS) using a fourth-generation (4G) or a third-generation (3G) radio access technology (RAT); and
the second DRB is served by a second BS using a fifth-generation (5G) RAT.

4. The method of claim 1, wherein:
editing the uplink PDUs further comprises deleting an SDAP header from each uplink PDU.

5. The method of claim 4, wherein:
the first DRB is served by a first base station (BS) using a fifth-generation (5G) radio access technology (RAT); and
the second DRB is served by a second BS using a fourth-generation (4G) RAT or a third-generation (3G) RAT.

6. An apparatus for wireless communications, comprising:
a processor configured to:
obtain an indication that a first data radio bearer (DRB) is released, wherein a first mapping maps a quality of service (QoS) flow to the first DRB, wherein the first DRB is configured, in a first configuration, not to use uplink service data adaptation protocol (SDAP) headers;
obtain a second mapping that maps the QoS flow to a second DRB, wherein the second DRB is configured, in a second configuration, to use SDAP headers;
edit uplink protocol data units (PDUs) in an uplink transmission buffer associated with the first DRB, based on a difference between the first configuration of the first DRB and the second configuration of the second DRB, wherein editing the uplink PDUs in the uplink transmission buffer associated with the first DRB comprises:
adding an SDAP header to each of the uplink PDUs; and
moving the uplink PDUs with the added SDAP headers from the uplink transmission buffer associated with the first DRB to an uplink transmission buffer associated with the second DRB; and
transmit the uplink PDUs via the second DRB; and
a memory coupled with the processor.

7. The apparatus of claim 6, wherein:
the processor is configured to edit the uplink PDUs by setting a QoS flow identifier (QFI) field in each of the SDAP headers to a QFI value of the first QoS flow.

8. The apparatus of claim 7, wherein:
the first DRB is served by a first base station (BS) using a fourth-generation (4G) or a third-generation (3G) radio access technology (RAT); and
the second DRB is served by a second BS using a fifth-generation (5G) RAT.

9. The apparatus of claim 6, wherein:
the processor is configured to edit the uplink PDUs by deleting an SDAP header from each uplink PDU.

10. The apparatus of claim 9, wherein:
the first DRB is served by a first base station (BS) using a fifth-generation (5G) radio access technology (RAT); and
the second DRB is served by a second BS using a fourth-generation (4G) RAT or a third-generation (3G) RAT.

11. An apparatus for wireless communications, comprising:
means for obtaining an indication that a first data radio bearer (DRB) is released, wherein a first mapping maps a quality of service (QoS) flow to the first DRB, wherein the first DRB is configured, in a first configuration, not to use uplink service data adaptation protocol (SDAP) headers;
means for obtaining a second mapping that maps the first QoS flow to a second DRB, wherein the second DRB is configured, in a second configuration, to use SDAP headers;
means for editing uplink protocol data units (PDUs) in an uplink transmission buffer associated with the first DRB, based on a difference between the first configuration of the first DRB and the second configuration of the second DRB, wherein the means for editing the uplink PDUs in the uplink transmission buffer associated with the first DRB comprises:
means for adding an SDAP header to each of the uplink PDUs; and
means for moving the uplink PDUs with the added SDAP headers from the uplink transmission buffer associated with the first DRB to an uplink transmission buffer associated with the second DRB; and
means for transmitting the uplink PDUs via the second DRB.

12. The apparatus of claim 11, wherein the means for editing the uplink PDUs further comprises means for setting a QoS flow identifier (QFI) field in each of the SDAP headers to a QFI value of the QoS flow.

13. The apparatus of claim 12, wherein:
the first DRB is served by a first base station (BS) using a fourth-generation (4G) or a third-generation (3G) radio access technology (RAT); and
the second DRB is served by a second BS using a fifth-generation (5G) RAT.

14. The apparatus of claim 11, wherein the means for editing the uplink PDUs further comprises means for deleting an SDAP header from each uplink PDU.

15. The apparatus of claim 14, wherein:
the first DRB is served by a first base station (BS) using a fifth-generation (5G) radio access technology (RAT); and
the second DRB is served by a second BS using a fourth-generation (4G) RAT or a third-generation (3G) RAT.

16. A non-transitory computer readable medium having instructions stored thereon that, when executed by a processor, cause the processor to perform a method for wireless communications, the method comprising:
- obtaining an indication that a first data radio bearer (DRB) is released, wherein a first mapping maps a quality of service (QoS) flow to the first DRB, wherein the first DRB is configured, in a first configuration, not to use uplink service data adaptation protocol (SDAP) headers;
- obtaining a second mapping that maps the first QoS flow to a second DRB, wherein the second DRB is configured, in a second configuration, to use SDAP headers;
- editing uplink protocol data units (PDUs) in an uplink transmission buffer associated with the first DRB, based on a difference between the first configuration of the first DRB and the second configuration of the second DRB, wherein editing the uplink PDUs in the uplink transmission buffer associated with the first DRB comprises:
  - adding an SDAP header to each of the uplink PDUs; and
  - moving the uplink PDUs with the added SDAP headers from the uplink transmission buffer associated with the first DRB to an uplink transmission buffer associated with the second DRB; and
- transmitting the uplink PDUs via the second DRB.

* * * * *